United States Patent
Cavallaro, III et al.

(10) Patent No.: US 9,862,634 B2
(45) Date of Patent: Jan. 9, 2018

(54) METHOD AND APPARATUS FOR REMOVING PERIPHERAL PORTION OF A GLASS SHEET

(75) Inventors: Nicholas Dominic Cavallaro, III, Painted Post, NY (US); Keith Mitchell Hill, Horseheads, NY (US); Harry J Reidy, Horseheads, NY (US); Liming Wang, Painted Post, NY (US); Zheming Zheng, Horseheads, NY (US); Naiyue Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1368 days.

(21) Appl. No.: 13/307,592

(22) Filed: Nov. 30, 2011

(65) Prior Publication Data

US 2013/0037592 A1   Feb. 14, 2013

Related U.S. Application Data

(60) Provisional application No. 61/522,937, filed on Aug. 12, 2011.

(51) Int. Cl.
*C03B 33/023* (2006.01)
*C03B 33/033* (2006.01)
*C03B 33/02* (2006.01)

(52) U.S. Cl.
CPC ........ *C03B 33/033* (2013.01); *C03B 33/0207* (2013.01); *B65G 2249/04* (2013.01); *Y10T 225/12* (2015.04); *Y10T 225/307* (2015.04)

(58) Field of Classification Search
CPC . C03B 33/023; C03B 33/0233; C03B 33/105; C03B 33/0235; C03B 33/037; C03B 33/0236; B65G 2249/04
USPC ............ 225/2, 94, 6, 93, 95–96.5, 103–105
See application file for complete search history.

(56) References Cited

U.S. PATENT DOCUMENTS

| 8,245,540 B2 | 8/2012 | Abramov et al. |
| 2004/0118159 A1* | 6/2004 | Rombouts et al. ............... 65/77 |
| 2006/0261118 A1* | 11/2006 | Cox et al. ........................ 225/96 |
| 2007/0062219 A1 | 3/2007 | Blevins et al. |

(Continued)

FOREIGN PATENT DOCUMENTS

| DE | 19700950 | 7/1998 |
| EP | 2100860 | 9/2009 |

(Continued)

OTHER PUBLICATIONS

Abstract of JP2005162604; 1 Page.
Abstract of JP05132328; 1 Page.
PCT/US2012/050261 Search Report.

*Primary Examiner* — Stephen Choi
*Assistant Examiner* — Fernando Ayala

(57) ABSTRACT

Process for removing peripheral portions such as bead regions of a glass sheet including a step of pushing the glass sheet in the peripheral portion using a pushing mechanism such as a pushing bar, and corresponding apparatus. As a result of the use of the pushing mechanism, the engagement completion time for suction cups, if used, are reduced significantly. A process without using suction cups is enabled with enhanced yield. The increased process stability and enlarged process window are particularly advantageous for processing glass sheets having high flexibility.

9 Claims, 5 Drawing Sheets

(56) References Cited

U.S. PATENT DOCUMENTS

| | | | |
|---|---|---|---|
| 2010/0043495 A1* | 2/2010 | Kirby et al. | 65/91 |
| 2010/0212361 A1* | 8/2010 | Abramov et al. | 65/105 |
| 2012/0048905 A1* | 3/2012 | Kudva et al. | 225/2 |

FOREIGN PATENT DOCUMENTS

| | | | |
|---|---|---|---|
| JP | 5-132328 | 5/1993 | |
| JP | 2005-162604 | 6/2005 | |
| JP | 2011190039 | 9/2011 | B65G 40/06 |
| WO | 2011118502 A1 | 9/2011 | |
| WO | WO 2011118502 A1 * | 9/2011 | B65D 19/16 |

\* cited by examiner

METHOD AND APPARATUS FOR REMOVING PERIPHERAL PORTION OF A GLASS SHEET

CROSS-REFERENCE TO RELATED APPLICATION

The present application claims priority to U.S. Provisional Patent Application Ser. No. 61/522,937, filed on Aug. 12, 2011 and entitled "METHOD AND APPARATUS FOR REMOVING PERIPHERAL PORTION OF A GLASS SHEET," the contents of which is incorporated herein by reference in its entirety.

FIELD

The present invention relates to method and apparatus for glass sheet periphery finishing. In particular, the present invention relates to method and apparatus for removing a peripheral portion of a glass sheet. The present invention is useful, e.g., for removing the bead regions of a glass sheet formed from a down-draw process for use as glass substrates for displays.

TECHNICAL BACKGROUND

Thin glass sheets have found use in many optical, electronic or optoeletronic devices, such as liquid crystal displays (LCD), organic light-emitting diode (OLED) displays, solar cells, as semiconductor device substrates, color filter substrates, cover sheets, and the like. The thin glass sheets, having a thickness from several micrometers to several millimeters, may be fabricated by a number of methods, such as float process, fusion down-draw process (a method pioneered by Corning Incorporated, Corning, N.Y., U.S.A.), slot down-draw process, and the like.

In many of the applications of thin glass sheets, it is highly desired that the glass sheets have (i) pristine surface quality essentially free of scratches, particles, and other defects; (ii) high thickness uniformity; (iii) low surface roughness and waviness. To that end, in the forming process for making the glass sheets, typically direct contact of the center region of major surfaces of the as-formed glass sheet with solid surfaces is avoided. Instead, only the peripheral region of the glass sheet was subjected to direct contact with solid surfaces such as edge rolls, pulling rolls, edge guiding rolls, and the like. Thus, the peripheral portions of both sides of an as-formed glass sheet obtained directly from the forming device, such as in the bottom-of-draw area of a fusion down-draw or slot down-draw process, sometimes called "beads," tend to have lower surface quality than the center region of the major surfaces. In addition, depending on the specific forming device used, the peripheral portions tend to have different thickness and significantly higher thickness variation than the center region.

Various glass sheet bead removal technologies were used or proposed previously with different yield, yield consistency, and cost of the processes and equipment.

The display market has shown increasing demand for glass sheets with high flexibility, i.e., those with large sheet width and/or length, and/or very small thickness. The present inventors have found that, for glass sheets with high flexibility, bead removal can be a significant challenge and an overall yield bottleneck in a glass sheet manufacture process. Thus, an acceptable bead removal process for a glass sheet with relatively low flexibility may be unacceptable for a glass sheet with significantly higher flexibility.

Thus, there is a genuine need of a robust glass sheet bead removal process with acceptable capability for glass sheets with high and/or low flexibility. The present invention satisfies this and other needs.

SUMMARY

Several aspects of the present invention are disclosed herein. It is to be understood that these aspects may or may not overlap with one another. Thus, part of one aspect may fall within the scope of another aspect, and vice versa.

Each aspect is illustrated by a number of embodiments, which, in turn, can include one or more specific embodiments. It is to be understood that the embodiments may or may not overlap with each other. Thus, part of one embodiment, or specific embodiments thereof, may or may not fall within the ambit of another embodiment, or specific embodiments thereof, and vice versa.

Thus a first aspect of the present disclosure relates to a process for removing a first peripheral portion of a glass sheet, comprising the following steps:

(I) providing a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the end of the first side edge surface;

(II) placing the glass sheet in a predetermined position by restraining the first and second major surfaces in the vicinity of the upper edge surface;

(III) after step (II), restraining the first and second major surfaces in the vicinity of the first side edge surface at a distance D1 from the end of the first side edge surface from the upper edge surface to the lower edge surface;

(IV) after step (III), forming a score-line on the first major surface extending from the vicinity of the upper edge surface to the vicinity of the lower edge surface at a distance from the end of the first side edge surface D2, where D2<D1;

(V) pushing the first major surface towards the second major surface at a distance from the end of the first side edge surface D3, where D3<D2;

(VI) after step (V), engaging the second major surface of the first peripheral portion with a plurality of suction cups;

(VII) contacting the second major surface with a nosing strip opposing the score-line;

(VIII) after steps (VI) and (VII), pulling the second major surface in a direction away from the first major surface by the suction cups, such that the first peripheral portion of the glass sheet in the vicinity of the first side edge surface bends against the nosing strip, and separates along the score-line from the center region of the glass sheet.

In certain embodiments of the process according to the first aspect of the present disclosure, the glass sheet is substantially vertical during steps (II)-(VIII).

In certain embodiments of the process according to the first aspect of the present disclosure, step (II), the first and second major surfaces of glass sheet in the vicinity of the upper edge surface are restrained by a vertical suspension device.

In certain embodiments of the process according to the first aspect of the present disclosure, in step (I), the first peripheral portion of the glass sheet as provided is warped in the direction from the upper edge surface to the lower edge surface when the glass sheet has a substantially uniform temperature at room temperature and is not subjected to an external force.

In certain embodiments of the process according to the first aspect of the present disclosure, in step (I), the first peripheral portion of the glass sheet as provided comprises a first section with knurled surface at least on the side of the second major surface, and a second section adjacent to the first section with a smooth surface on the side of the second major surface, and in step (VI), the second section, but not the first section, of the first peripheral portion engages with the suction cups.

In certain embodiments of the process according to the first aspect of the present disclosure, in step (VI), the engagement of all the suction cups to the second major surface of the first peripheral portion is completed in at most 5 seconds.

In certain embodiments of the process according to the first aspect of the present disclosure, in step (II), the first and second major surfaces in the vicinity of the upper edge surface are secured to a suspension device by using a clamp.

In certain embodiments of the process according to the first aspect of the present disclosure, in step (III), the first and second major surfaces in the vicinity of the first side edge surface are secured by a clamp at a distance D1 from the end of the first side edge surface from the upper edge surface to the lower edge surface.

In certain embodiments of the process according to the first aspect of the present disclosure, step (VII) precedes step (IV), and in step (IV), a mechanical score wheel is used to press against the first major surface and form the score-line.

In certain embodiments of the process according to the first aspect of the present disclosure, in step (I), the center thickness Th(C) of the glass sheet is at least 400 µm.

In certain embodiments of the process according to the first aspect of the present disclosure, in step (I), the glass sheet has a height of at least 1000 mm.

In certain embodiments of the process according to the first aspect of the present disclosure, in step (I), the glass sheet has a width of at least 1000 mm.

In certain embodiments of the process according to the first aspect of the present disclosure, the glass sheet is made by a down-draw process.

In certain embodiments of the process according to the first aspect of the present disclosure, in step (IV), the score-line is formed by using a laser beam.

In certain embodiments of the process according to the first aspect of the present disclosure, 5 cm≤D1≤50 cm.

In certain embodiments of the process according to the first aspect of the present disclosure, 4 cm≤D2≤40 cm.

In certain embodiments of the process according to the first aspect of the present disclosure, 0.5 cm≤D3≤20 cm.

In certain embodiments of the process according to the first aspect of the present disclosure, in step (V), the first major surface is pushed towards the second major surface using a straight pushing bar.

In certain embodiments of the process according to the first aspect of the present disclosure, in step (V), the straight pushing bar has a height extending substantially from the upper edge surface to the lower edge surface.

In certain embodiments of the process according to the first aspect of the present disclosure, in step (VIII), while the second major surface of the glass sheet is being pulled by the suction cups, the first major surface is simultaneously being pushed by the straight pushing bar.

In certain embodiments of the process according to the first aspect of the present disclosure, the suspension device in step (II) is part of a glass conveying device.

In certain embodiments of the process according to the first aspect of the present disclosure, step (IV) precedes step (VI).

In certain embodiments of the process according to the first aspect of the present disclosure, step (VI) precedes step (IV).

A second aspect of the present disclosure relates to an apparatus for removing a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the end of the first side edge surface, comprising the following:

(A) a glass suspension device adapted for placing the glass sheet in a vertical position by restraining the first and second major surfaces in the vicinity of the upper edge surface;

(B) a first side edge restraining tower located on the side of the first major surface comprising a first side edge restraining clamp strip, and a second side edge restraining tower located on the side of the second major surface comprising a second side edge restraining clamp strip, the distance between the first side edge restraining clamp strip and the second side edge restraining clamp strip being adjustable and adapted for restraining the first and second major surfaces in the vicinity of the first side edge surface at a distance D1 from the end of the first side edge surface extending from the upper edge surface to the lower edge surface;

(C) a mechanical scoring wheel installed on the first side edge restraining tower adapted for vertical motion in contact with the first major surface to form a score-line on the first major surface extending from the vicinity of the upper edge surface to the vicinity of the lower edge surface at a distance from the end of the first side edge surface D2, where D2<D1;

(D) a straight, vertical bar adapted for pushing the first major surface towards the second major surface;

(E) a plurality of suction cups adapted for engaging the second major surface of the first peripheral portion at a distance from the end of the first side edge surface D3, where D3<D2;

(F) a nosing strip opposing the score-line adapted for contacting the second major surface; and (G) a force applicator adapted for pulling the second major surface in a direction away from the first major surface by the suction cups, such that the first peripheral portion of the glass sheet in the vicinity of the first side edge surface bends against the nosing strip, and separates along the score-line from the center region of the glass sheet.

In certain embodiments of the apparatus according to the second aspect of the present disclosure, the nosing strip has a Shore A hardness not lower than the glass sheet.

In certain embodiments of the apparatus according to the second aspect of the present disclosure, the nosing strip is supported by a seat that is sufficiently rigid such that the nosing strip remains substantially linear when the score wheel presses the first major surface of the glass against the nosing strip.

In certain embodiments of the apparatus according to the second aspect of the present disclosure, the nosing strip comprises a material selected from aluminum and alloys thereof, stainless steel, and hard rubber and plastics.

A third aspect of the present disclosure relates to a process for removing a first peripheral portion of a glass sheet, comprising the following steps:

(I) providing a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the end of the first side edge surface;

(II) placing the glass sheet in a position by restraining the first and second major surfaces in the vicinity of the upper edge surface;

(III) after step (II), restraining the first and second major surfaces in the vicinity of the first side edge surface at a distance D1 from the end of the first side edge surface from the upper edge surface to the lower edge surface;

(IV) after step (III), forming a score-line on the first major surface extending from the vicinity of the upper edge surface to the vicinity of the lower edge surface at a distance from the end of the first side edge surface D2, where D2<D1;

(V) contacting the second major surface with a nosing strip opposing the score-line; and (VI) after step (V), pushing the first major surface towards the second major surface at a distance from the end of the first side edge surface D3, where D3<D2, such that the first peripheral portion of the glass sheet in the vicinity of the first side edge surface bends against the nosing strip, and separates along the score-line from the center region of the glass sheet.

In certain embodiments of the process according to the third aspect of the present disclosure, the glass sheet is substantially vertical during steps (II)-(VI).

In certain embodiments of the process according to the third aspect of the present disclosure, in step (II), the first and second major surfaces of the glass sheet in the vicinity of the upper edge surface are restrained by a vertical suspension device.

In certain embodiments of the process according to the third aspect of the present disclosure, in step (I), the first peripheral portion of the glass sheet as provided is warped in the direction from the upper edge surface to the lower edge surface when the glass sheet has a substantially uniform temperature at room temperature and is not subjected to an external force.

In certain embodiments of the process according to the third aspect of the present disclosure, in step (II), the first and second major surfaces in the vicinity of the upper edge surface are secured to a suspension device by using a clamp.

In certain embodiments of the process according to the third aspect of the present disclosure, in step (III), the first and second major surfaces in the vicinity of the first side edge surface are secured by a clamp at a distance D1 from the end of the first side edge surface extending from the upper edge surface to the lower edge surface.

In certain embodiments of the process according to the third aspect of the present disclosure, step (V) precedes step (IV), and in step (IV), a mechanical score wheel is used to press against the first major surface and form the score-line thereon.

In certain embodiments of the process according to the third aspect of the present disclosure, in step (I), the center thickness Th(C) of the glass sheet is at least 300 μm.

In certain embodiments of the process according to the third aspect of the present disclosure, in step (I), the glass sheet has a height of at least 1000 mm.

In certain embodiments of the process according to the third aspect of the present disclosure, in step (I), the glass sheet has a width of at least 1000 mm.

In certain embodiments of the process according to the third aspect of the present disclosure, the glass sheet is made by a down-draw process.

In certain embodiments of the process according to the third aspect of the present disclosure, in step (IV), the score-line is formed by using a laser beam.

In certain embodiments of the process according to the third aspect of the present disclosure, 5 cm≤D1≤50 cm.

In certain embodiments of the process according to the third aspect of the present disclosure, 4 cm≤D2≤40 cm.

In certain embodiments of the process according to the third aspect of the present disclosure, 0.5 cm≤D3≤20 cm.

In certain embodiments of the process according to the third aspect of the present disclosure, in step (VI), the first major surface is pushed towards the second major surface using a straight pushing bar extending from the upper edge surface to the lower edge surface.

In certain embodiments of the process according to the third aspect of the present disclosure, the suspension device in step (II) is part of a glass conveying device.

A fourth aspect of the present disclosure relates to an apparatus for removing a first peripheral portion of a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the end of the first side edge surface, comprising the following:

(A) a glass suspension device adapted for placing the glass sheet in a vertical position by restraining the first and second major surfaces in the vicinity of the upper edge surface;

(B) a first side edge restraining tower located on the side of the first major surface comprising a first side edge restraining clamp strip, and a second side edge restraining tower located on the side of the second major surface comprising a second side edge restraining clamp strip, the distance between the first side edge restraining clamp strip and the second side edge restraining clamp strip being adjustable and adapted for restraining the first and second major surfaces in the vicinity of the first side edge surface at a distance D1 from the end of the first side edge surface from the upper edge surface to the lower edge surface;

(C) a mechanical scoring wheel installed on the first side edge restraining tower adapted for vertical motion in contact with the first major surface to form a score-line on the first major surface extending from the vicinity of the upper edge surface to the vicinity of the lower edge surface at a distance from the end of the first side edge surface D2, where D2<D1;

(D) a straight, vertical bar adapted for pushing the first major surface towards the second major surface; and (E) a nosing strip opposing the score-line adapted for contacting the second major surface.

In certain embodiments of the apparatus according to the fourth aspect of the present disclosure, the nosing strip has a Shore A hardness not lower than the glass sheet.

In certain embodiments of the apparatus according to the fourth aspect of the present disclosure, the nosing strip is supported by a seat that is sufficiently rigid such that the nosing strip remains substantially linear when the score wheel presses the first major surface of the glass against the nosing strip.

In certain embodiments of the apparatus according to the fourth aspect of the present disclosure, the nosing strip comprises a material selected from aluminum, stainless steel and hard rubber.

One or more embodiments and/or aspects of the present disclosure have the following advantages. First, by using a vertical pushing bar to push the glass sheet from the first major surface to the second major surface, the suction cup engagement completion time and variability thereof are reduced, resulting in a more robust peripheral portion removal process with higher yield. Second, due to the additional restraining provided by the vertical pushing bar, the process and apparatus are less sensitive to sheet warp from the upper to the lower edge surfaces, thus capable of handling glass sheets with high flexibility. Third, the use of the pushing bar can completely eliminate the need of suction cups to hold the peripheral portion of the glass sheet during peripheral portion removal, and surprisingly result in significantly higher yield at low glass thicknesses compared to processes and apparatuses using suction cups.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification.

DETAILED DESCRIPTION OF THE INVENTION

As mentioned supra, the process and apparatus of the present disclosure are particularly advantageous for removing the bead regions of a glass sheet, and as such, will be subsequently illustrated in the context of bead region removal. However, one having ordinary skill in the art should readily appreciate that, upon reading the specification of the present application and with the benefit of the teachings herein, the process and apparatus of the present disclosure may be used for removing a peripheral portion of any glass sheet, which may or may not be a region comprising a bead. For example, the process and apparatus as disclosed herein can be used to resize a glass sheet without a bead region.

For the convenience of description, a glass sheet is a piece of glass material having two major surfaces i.e., a first major surface and a second major surface, with a width, a length, and a thickness defined as the distance from the first major surface to the second major surface. The first and second major surfaces are connected, at four sides, by an upper edge surface, a lower edge surface, a first side edge surface and a second side edge surface. The upper edge surface, the lower edge surface, the first side edge surface and the second side edge surface may be substantially planar or curved.

For the convenience of description, the various steps of the processes in accordance with various aspects and embodiments of the present disclosure are numbered as (I), (II), ... (VIII), and the like. It is to be understood that, unless specifically indicated otherwise or the context indicates to the contrary, the steps can be carried out in any order.

Figure 1A:
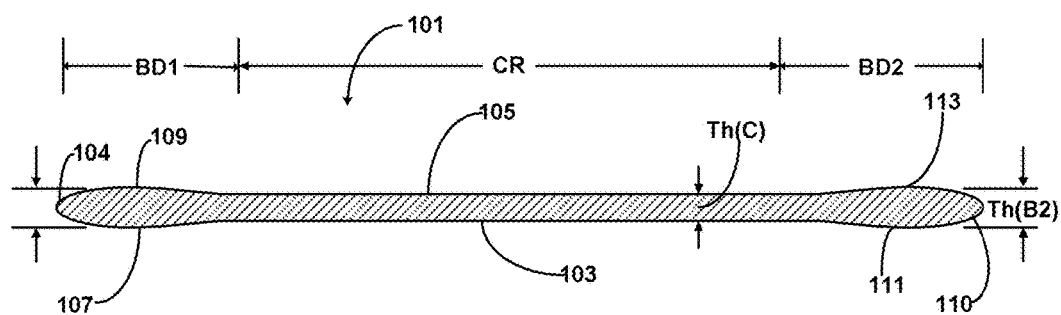
FIGS. 1A and 1B are schematic illustrations of the cross-sectional view and front view of a glass sheet comprising a center region and two bead regions that may be subjected to peripheral region removal according to the present disclosure.
Figure 1B:
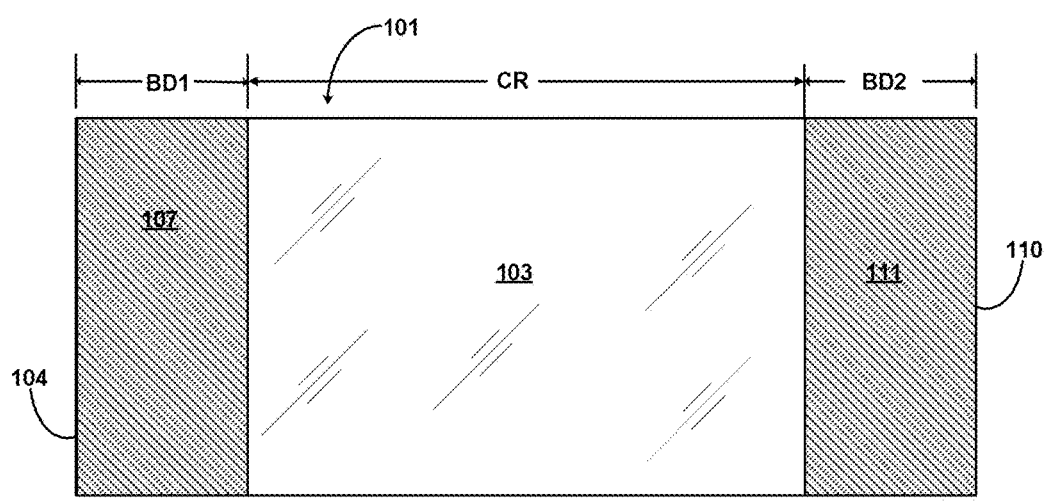

FIG. 1A schematically illustrates the cross-sectional view of a glass sheet 101 formed at the bottom-of-the-draw by a fusion down-draw process intercepted by a plane substantially perpendicular to the first and second major surfaces. This glass sheet 101 can be advantageously finished using the apparatus and method of the present disclosure. The glass sheet 101 has: a first major surface 103; a second major surface 105; a curved first side edge surface 104 having an end with the largest distance from the center line of the first major surface, and a curved second side edge surface 110 having an end with the largest distance from the center line of the first major surface, each connecting the first major surface 103 and the second major surface 105, respectively. The glass sheet 101 comprises a center region (CR) having a substantially uniform thickness Th(C), a first bead region BD1 corresponding and adjacent to the first side edge surface 104, having a curved first bead surface 107 and a curved second bead surface 109 on one side of the glass sheet, and a second bead region BD2 corresponding and adjacent to the second side edge surface 110, having a curved third bead surface 111 and a curved fourth bead surface 113. The maximal thickness of the first bead region BD1, defined as the maximal thickness thereof when intercepted by virtual planes perpendicular to a flattened first major surface 103 and/or second major surface 105 in the center region, is Th(B1). The second bead region BD2 has a maximal thickness Th(B2), which may be substantially the same or different from Th(B1). Likewise, the first bead region BD1 and the second bead region BD2 may have the same or different width. FIG. 1B schematically illustrates the front view of the same glass sheet when viewed in the direction from the first major surface 103 to the second major surface 105.

The center region CR of the glass sheet with high, pristine surface quality, is sometimes called quality region. Normally, in the process of manufacturing an electronic/optic device based on a glass substrate, functional devices, such as semiconductor devices, other electronic devices and optical devices, and the like, are formed on a major surface of the glass sheet only after the first and second bead regions are removed. After the removal of the both the edge portions, the glass sheet may be then subjected to edge finishing such as grinding and polishing, followed by cleaning and drying, before functional devices such transistors and the like are deposited on the quality area CR of one or two of the first and second major surfaces.

As used herein, a first peripheral portion of a glass sheet is a portion thereof in the vicinity of the first side edge surface intended to be removed from the rest of the glass sheet. The center region of the glass sheet is normally the portion thereof intended to be retained and used for a subsequent application. Referring to FIGS. 1A and 1B, the first peripheral portion of the glass sheet 101 advantageously corresponds to the first bead region BD1. Below the present invention is described and illustrated with respect the first peripheral portion only. However, one having ordinary skill in the art, having benefited from the disclosure herein upon reading the present disclosure, should readily appreciate that the in a real glass sheet peripheral portion finishing process, either or both of the first peripheral portion and the second peripheral portion may be processed according to the various aspects and embodiments of the process of the present disclosure using an apparatus according to various aspects and embodiments of the present disclosure. Indeed, it is also possible that the peripheral portions of the glass sheet adjacent to the upper edge surface and the lower edge surface may be processed in substantially the same manner as the first peripheral portion upon a 90° rotation of the glass sheet. Such processing of multiple peripheral portions of the glass sheet can be carried our sequentially or simultaneously. In certain specifically advantageous embodiments, the first and second peripheral portions of the same glass sheet may be processed substantially simultaneously in a substantially synchronized and symmetric manner.

In step (II), the glass sheet 101 is placed in a predetermined position, such as a substantially horizontal position where the gravitational acceleration vector is substantially perpendicular to a flattened first major surface 103, or a substantially vertical position where the gravitational acceleration vector is substantially parallel to the first major surface 103 of the glass sheet 101. It is highly desired that, during all steps (II) to (VIII), the position of the glass sheet is substantially stable, i.e., the angle between the gravitational acceleration vector and the first major surface does not vary more than 10°, in certain embodiments not more than 8°, in certain other embodiments not more than 6°, in certain other embodiments not more than 5°, in certain other embodiments not more than 4°, in certain embodiments not more than 3°, in certain other embodiments not more than 2°. The placing of the glass sheet into the predetermined position is advantageously effected by restraining the first and second major surfaces in the vicinity of the upper edge surface to a suspension device.

A relatively large glass sheet with a relatively thin thickness made in a real glass sheet manufacture process, such as a fusion down-draw process, a float process or a slot down-draw process, will exhibit a natural curvature, sometimes called "warp," if it has a substantially uniform temperature around the room temperature in a gravity-free environment, due to the presence of various level of internal stress distributed in the glass sheet as a result of the unique mechanical and/or thermal history the glass sheet has been subjected to. For example, in a typical fusion down-draw process, the glass sheet is formed by drawing a viscous glass ribbon formed at the root of a forming device called isopipe into desired width and thickness while cooling it to a viscoelastic state, and eventually elastic state. Mechanical rollers contact the peripheral region, called beads, while the glass ribbon is being drawn-down. Discrete glass sheets are then cut from a continuous glass ribbon, normally with the beads remaining in place, and finally cooled to around room temperature. The glass material in the glass sheet was subjected to slightly different thermal history from one side to the other, and from the top to the bottom. For example, the bead region of the glass ribbon normally has a larger thickness, and therefore would normally cool down at a slower rate compared to the thinner, center region, in the same cooling environment. The differential thermal history causes internal residual stress in the glass sheet when the glass sheet is at a substantially uniform temperature at around room temperature.

Figure 5:
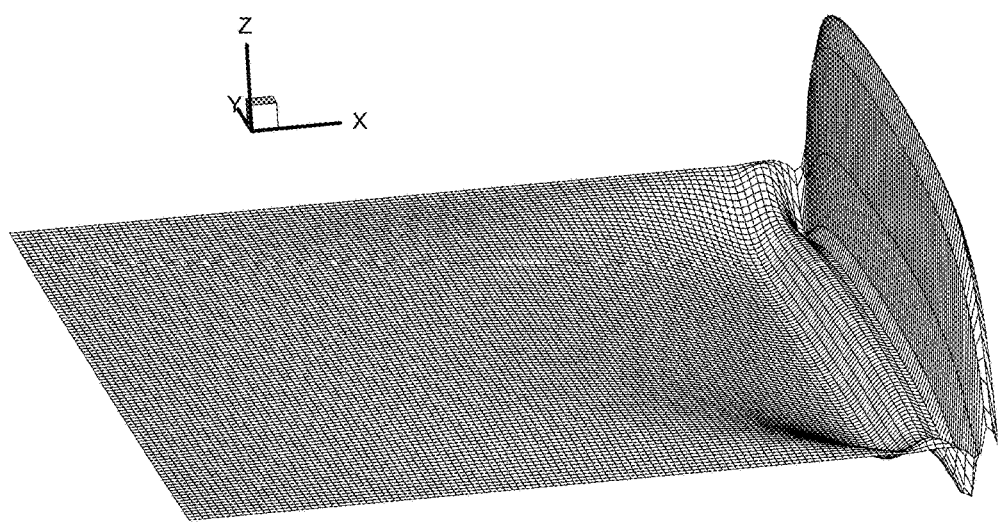
FIG. 5 is a diagram showing stress distribution in a glass sheet having a bead region before preferential bead heating.

FIG. 5 is a diagram showing the stress distribution profile of a part of an exemplary glass sheet made by a fusion down-draw process. Shown on the horizontal axis is distance from the centerline of the glass sheet, and on the vertical axis is the distance from the upper edge of the sheet. The rightmost peripheral portion comprising a bead exhibits the highest stress of up to 3225 psi, while the center region has substantially zero stress. This residual stress distribution profile can impart a curvature to the glass sheet, sometimes called warp, as mentioned supra. The warp will be three-dimensional in nature: it will be present vertically from the upper edge surface, and horizontally from the first side edge surface to the second side edge surface.

When a glass sheet exhibits a natural warp in a gravity-free environment, it will normally exhibit a natural warp if it is hung from the upper edge in the gravity field if no further external restraint is imposed to counteract the internal stress. The presence of the residual stress inside the glass sheet and the natural curvature of the glass sheet, when hung at a vertical position, make the removal of the peripheral portion such as the bead region difficult. The methods and apparatuses of the present disclosure are particularly advantageous for removing the peripheral portions of such glass sheet that would normally exhibit a gravity-free warp when at a substantially uniform temperature around room temperature, for reasons to be explained in greater detail and depth infra.

When a glass sheet exhibits a natural warp in a gravity-free environment, it will normally exhibit a natural warp if it is hung from the upper edge in the gravity field if no further external restraint is imposed to counteract the internal stress. The presence of the residual stress inside the glass sheet and the natural curvature or the glass sheet, when hung at a vertical position, makes the removal of the peripheral portion such as the bead region difficult. The methods and apparatuses of the present disclosure are particularly advantageous for removing the peripheral portions of such glass sheet that would normally exhibit a gravity-free warp when at a substantially uniform temperature around room temperature, for reasons to be explained in greater detail and depth infra.

As mentioned supra in the context of a fusion down-draw forming process, in any glass forming process involving a drawing operation of the glass material at a viscous state, normally the glass is restrained at the edge area by, e.g., a pair of rollers pinching both sides of the peripheral region. The direct contact between the glass and the roller at higher temperature and low glass viscosity would result in the formation of a knurled surface in the bead region. Normally, the bead region tends to have a varying thickness profile. For example, FIG. 1A shows a beaded regions BD1 and BD2 having maximal thicknesses Th(B1) and Th(B2) appreciably larger than the thickness of the center region, Th(C). Normally, between the region having a knurled surface and the quality center region having a substantially uniform thickness Th(C), there exists an intermediate region that has a substantially smooth surface due to lack of direct contact with an edge roller, but a varying thickness profile not as uniform as that of the center region. The combination of the region having the curved edge surface 104, the region with knurled surface, and the region with a substantially smooth surface and a varying thickness profile, constitutes the first peripheral region subjected to removal by using the process and apparatus according to the present disclosure. In certain specifically advantageous embodiments, the suction cups are directly engaged with the second section, i.e., the section with smooth surfaces, but not the first section, i.e., the section with knurled surface, to ensure leak-free and robust contact and reduce the engagement completion time for the suction cups.

In the process according to the first aspect of the present disclosure, as a result of the inclusion of step (V), i.e., the step of pushing the first major surface of the glass sheet towards the second major surface at a distance from the end of the first side edge surface D3, where D3<D2, the engagement of the suction cups to the second surface of the glass sheet is greatly facilitated compared with a process without step (V). Thus, the engagement of all the suction cups to the second major surface of the first peripheral portion is completed in at most 5 seconds, in certain embodiments in at most 3 seconds, in certain embodiments in at most 2 seconds, in certain embodiments in at most 1 second, in certain other embodiments in at most 0.5 second, in certain other embodiment in at most 0.4 second, in certain other embodiments in at most 0.3 second. Compared to a process without step (V), the process of the present disclosure in certain embodiments reduces the engagement completion time by at least ¼, in certain embodiments by at least ⅓, in certain other embodiments by at least ½. The engagement of the suction cups with a surface of the glass sheet typically include a step of contacting the suction cups with the surface of the glass sheet, followed by applying a vacuum to the internal cavity of the suction cups, as is typical in industrial suction cups, to effect a firm and robust engagement therebetween. Firm and robust engagement of the suction cups to the surface of the glass sheet would allow for tensioning of the glass sheet via the glass sheet. As used herein, engagement completion time is defined as the time interval between the moment when the first suction cup touches the second major surface and the moment when all suction cups are securely engaged with the second major surface, e.g., when the internal air pressure inside all the suction cup cavities has been reduced to at most 60 kPa, in certain embodiments at most 50 kPa, in certain other embodiments at most 40 kPa. For glass sheets with a high flexibility, i.e., glass sheets having a FXTY=LD/Th≥1000, where FXTY is flexibility, LD is the larger dimension in mm of the glass sheet of the width, measured from the end of the first side edge surface to the end of the second side edge surface, and the height, measured from the upper edge surface to the lower edge surface, and Th is the thickness of the quality area of the glass sheet in mm, the engagement of the glass sheet with the suction cups is an important process parameter for process stability, and it can be quite long. Typically, the larger the flexibility of the glass sheet, the more likely the glass sheet is to warp across the plane, and the more likely it would take longer to engage the glass sheet with the suction cups if step (V) is not carried out. Thus, the process of the present disclosure is especially advantageous for bead removal of glass sheets with a FXTY≥1000, even more advantageous where FXTY≥2000, even more advantageous where FXTY≥3000, even more advantageous where FXTY≥4000, even more advantageous where FXTY≥5000, even more advantageous where FXTY≥6000, even more advantageous where FXTY≥7000, even more advantageous where FXTY≥8000, even more advantageous where FXTY≥9000, even more advantageous where FXTY≥10000. Moreover, due in part to the inclusion and implementation of step (V), the process of the present disclosure reduces the variability of the suction cup engagement completion time from run to run, and the variability of suction cup engagement completion time from glass sheet with one FXTY to a different glass sheet with a different FXTY. Thus, the process of the present disclosure can be used for making a large variety of glass sheet products with a large process window.

In certain embodiments of the process according to the first aspect of the present disclosure, in step (II), the first and second major surfaces in the vicinity of the upper edge surface are secured to a suspension device by using a clamp. The clamp can be affixed to an overhead glass sheet conveyor device. The clamp can be engaged with the glass sheet before the glass sheet moves into the apparatus of the present disclosure for removing the peripheral portion, and then the glass sheet is transferred into the apparatus for peripheral portion finishing. Before the engagement of the glass sheet with the suction cups, the clamp securing the upper portion of the glass sheet would substantially provide the force to counteract the gravity of the glass sheet, and suspend the glass sheet in a vertical position. Alternatively, suction cups may be used to secure the upper portion of the glass sheet in place of the clamp. The location in the vicinity of the upper edge surface secured by the clamp, suction cups and the like, has a minimal distance D0 from the end of the first side edge surface.

In certain embodiments, in step (III), the first and second major surfaces in the vicinity of the first side edge surface are secured by a clamp (or suction cups or other securing devices) at a distance D1 from the end of the first side edge surface from the upper edge surface to the lower edge surface. In certain embodiments, 5 cm≤D1≤50 cm, in certain embodiments 5 cm≤D1≤40 cm, in certain embodiments 5 cm≤D1≤30 cm, in certain embodiments 5 cm≤D1≤20 cm, in certain embodiments 5 cm≤D1≤15 cm, in certain other embodiments 5≤D1≤10 cm. Normally, D1≤D0.

In certain embodiments of the processes of the first aspect of the present disclosure, step (VII) precedes step (IV), and in step (IV), a mechanical score wheel is used to press against the first major surface and form the score-line. Normally, where a mechanical score-wheel is used to form a score-line on a surface of a glass sheet, a support device such as a nosing strip on the opposing side of the glass sheet is needed to enable sufficient contact force of the score-wheel to the surface of the glass sheet and the formation of a consistent, continuous score-line on the first major surface of the glass sheet. Alternatively, the score-line can be formed by a laser process, e.g., by scanning with a $CO_2$ laser followed by a cooling jet to form a vent. Where laser scoring is utilized, the back-up nosing may be unnecessary in the score-line forming process and as such, step (VII) does not necessarily precede step (IV).

While the process and apparatus according to the first and second aspects of the present disclosure are particularly advantageous for finishing glass sheets with a high flexibility FXTY as discussed above, it is particularly advantageous for finishing glass sheets with a center thickness Th(C) of at least 400 μm, in certain embodiments at least 500 μm, in certain other embodiments at least 600 μm, in certain other embodiments at least 700 μm. This is because, when the Th(C) of the glass sheet is below 400 μm, the warpage of the glass sheet along the first and second peripheral portion can be so large that engaging with suction cups becomes very difficult, rendering the use of suction cups to engage and restrain the peripheral portions impractical.

As discussed above, due to the presence of step (V) involving pushing the first major surface towards the second major surface, the process and apparatus according to the first and second aspects of the present disclosure have the advantage of a large process window capable of finishing large glass sheet with a high flexibility. This is particularly advantageous for glass sheet with a large vertical height HT, in which direction the glass sheet can exhibit substantial warpage and difficulty in engaging with the second major surface. Thus, the process and apparatus are particularly advantageous for glass sheets having a height of at least 1000 mm, in certain embodiments at least 1200 mm, in certain other embodiments at least 1500 mm, in certain other embodiments at least 1800 mm, in certain other embodiments at least 2000 mm, in certain other embodiments at least 2500 mm, in certain other embodiments at least 3000 mm.

Similarly, the process and apparatus are particularly advantageous for glass sheets with a large width WD, measured from the end of the first side edge surface to the end of the second side edge surface. Thus, the process and apparatus according to the first and second aspects of the present disclosure are particularly advantageous for finishing glass sheets having a width of at least 1000 mm, in certain embodiments at least 1200 mm, in certain other embodiments at least 1500 mm, in certain other embodiments at least 1800 mm, in certain other embodiments at least 2000 mm, in certain other embodiments at least 2500 mm, in certain other embodiments at least 3000 mm.

The process and apparatus of the present disclosure are particularly advantageous for finishing glass sheets made by down-draw processes, such as the fusion down-draw process pioneered by Corning Incorporated, Corning, N.Y. This is because in down-draw processes, the glass ribbon below the forming device, such as the isopipe and the slot, tends to undergo a temperature gradient profile leading to substantial thermal residual stress in the glass sheet produced, leading to warp in the peripheral portions defying the removal thereof in the later finishing step.

In certain embodiments of the process and apparatus according to the first and second aspects of the present disclosure, it is advantageous that the distance from the score-line to the end of the first side edge surface is D2, where $4 \text{ cm} \leq D2 \leq 40 \text{ cm}$, in certain embodiments $4 \text{ cm} \leq D2 \leq \text{cm}$, in certain embodiments $4 \text{ cm} \leq D2 \leq 30 \text{ cm}$, in certain embodiments $4 \text{ cm} \leq D2 \leq 20 \text{ cm}$, in certain embodiments $4 \text{ cm} \leq D2 \leq 15 \text{ cm}$, in certain other embodiments $4 \text{ cm} \leq D2 \leq 10 \text{ cm}$. In general, it is desired that the score-line is formed at a location where the thickness of the glass sheet is substantially the same as that of the quality area of the glass sheet, thus resulting in an as-cut glass sheet at the end of the process with a substantially uniform thickness from edge to edge.

In step (V), a pushing bar pushes the first major surface of the glass sheet towards the second major surface. The pushing location should be between the score-line and the end of the first side edge surface, i.e., $D3<D2$. In certain embodiments, $0.5 \text{ cm} \leq D3 \leq 20 \text{ cm}$, in certain embodiments $0.5 \text{ cm} \leq D3 \leq 15 \text{ cm}$, in certain embodiments $0.5 \text{ cm} \leq D3 \leq 10 \text{ cm}$, in certain embodiments $0.5 \text{ cm} \leq D3 \leq 8 \text{ cm}$, in certain embodiments $0.5 \text{ cm} \leq D3 \leq 5 \text{ cm}$, in certain other embodiments $0.5 \text{ cm} \leq D3 \leq 3 \text{ cm}$.

The pushing in step (V) can be advantageously carried out using a straight pushing bar extending substantially from the upper edge surface to the lower edge surface. Alternatively, multiple straight bars can be used and work in a synchronous manner to contact and push the first major surface simultaneously. The bar is desired to be hard and rigid, such that its shape remains substantially unchanged during the pushing process. Thus, the material of the bar directly contacting the first major surface can be selected from metals, such as aluminum, stainless steel, and the like, or hard, durable plastic or rubber materials, such as hard silicone rubber material. Still alternatively, a long, narrow jet of a fluid, such as air, can be directed to the desired location of the peripheral portion as described above to effect the pushing.

In certain specifically advantageous embodiments, during the process according to the first aspect of the present disclosure, in step (VIII), when the second major surface of the glass sheet is being pulled by the suction cups, the first major surface is simultaneously being pushed by the straight bar. In this embodiment, the edge portions of the glass sheet is securely and firmly restrained by the suction cups and pushing bar, resulting in a consistent separation of the peripheral portion from the quality area along the score-line.

In the process of the first aspect of the present disclosure, in certain embodiments, step (VI) can precede step (IV), i.e., the score-line is formed, by mechanical scoring using a mechanical score-wheel, or by a laser scoring using a scanning laser beam, after the engagement of the suction cups to the second major surface of the glass sheet. In these embodiments, the suction cups may apply tensional forces to the glass sheet during step (IV) to obtain a substantially flat first major surface in step (IV), thereby facilitating the score-line formation. In other embodiments, step (IV) can precede step (VI), i.e., the suction cups are not engaged with the second major surface of the glass unless the score-line has already been formed on the first major surface of the glass sheet. Because in step (III), the first and second major surfaces in the vicinity of the first side edge surface of the glass sheet is secured by, e.g., a clamp, the score-line can be formed, even if mechanical score wheel is used, without the suction cups engaged first.

A second aspect of the present disclosure is an apparatus for use in carrying out certain embodiments of the process according to the first aspect of the present disclosure. The apparatus advantageously comprises:

(A) a glass suspension device adapted for placing the glass sheet in a vertical position by restraining the first and second major surfaces in the vicinity of the upper edge surface;

(B) a first side edge restraining tower located on the side of the first major surface comprising a first side edge restraining clamp strip, and a second side edge restraining tower located on the side of the second major surface comprising a second side edge restraining clamp strip, the distance between the first side edge restraining clamp strip and the second side edge restraining clamp strip being adjustable and adapted for restraining the first and second major surfaces in the vicinity of the first side edge surface at a distance D1 from the end of the first side edge surface extending from the upper edge surface to the lower edge surface;

(C) a mechanical scoring wheel installed on the first side edge restraining tower adapted for vertical motion in contact with the first major surface to form a score-line on the first major surface extending from the vicinity of the upper edge surface to the vicinity of the lower edge surface at a distance from the end of the first side edge surface D2, where $D2<D1$;

(D) a straight, vertical bar adapted for pushing the first major surface towards the second major surface;

(E) a plurality of suction cups adapted for engaging the second major surface of the first peripheral portion at a distance from the end of the first side edge surface D3, where D3<D2;

(F) a nosing strip opposing the score-line adapted for contacting the second major surface; and (G) a force applicator adapted for pulling the second major surface in a direction away from the first major surface by the suction cups, such that the first peripheral portion of the glass sheet in the vicinity of the first side edge surface bends against the nosing strip, and separates along the score-line from the center region of the glass sheet.

In certain advantageous embodiments of the apparatus according to the second aspect of the present disclosure, the nosing strip has a Shore A hardness not lower than the glass sheet. The high hardness of the nosing strip prevents the glass sheet from excessive local deformation when pressed by a mechanical score-wheel, thereby enabling the consistent formation of score-line with consistent vent depth and without loss of touch of the score-wheel with the surface of the glass sheet and thereby loss of vent. A continuous score-line with substantially uniform vent depth extending from the vicinity of the upper edge surface to the vicinity of the lower edge surface is beneficial for the separation of the peripheral portion in step (VIII) without creating sharp edges, excessive glass chips, non-straight edge and other undesired features. To that end, the nosing strip material directly contacting the first major surface of the glass sheet can be selected from a metal, such as aluminum and alloys thereof, stainless steel, and hard plastic and rubber materials with the desired temperature capability and hardness. Furthermore, it is desired that the nosing strip is supported by a seat that is sufficiently rigid such that the nosing strip remains substantially linear when the score wheel presses the first major surface of the glass against the nosing strip.

A third aspect of the present disclosure is another process for removing a first peripheral portion of a glass sheet, comprising the following steps:

(I) providing a glass sheet having a first major surface, a second major surface opposing the first major surface, a center region having a center thickness Th(C), an upper edge surface, a lower edge surface, a first side edge surface and a second side edge surface, each edge surface connecting the first major surface and the second major surface, and the first peripheral portion in the vicinity of the end of the first side edge surface;

(II) placing the glass sheet in a position by restraining the first and second major surfaces in the vicinity of the upper edge surface;

(III) after step (II), restraining the first and second major surfaces in the vicinity of the first side edge surface at a distance D1 from the end of the first side edge surface from the upper edge surface to the lower edge surface;

(IV) after step (III), forming a score-line on the first major surface extending from the vicinity of the upper edge surface to the vicinity of the lower edge surface at a distance from the end of the first side edge surface D2, where D2<D1;

(V) contacting the second major surface with a nosing strip opposing the score-line;

(VI) after step (V), pushing the first major surface towards the second major surface at a distance from the end of the first side edge surface D3, where D3<D2, such that the first peripheral portion of the glass sheet in the vicinity of the first side edge surface bends against the nosing strip, and separates along the score-line from the center region of the glass sheet.

Compared to the process of the first aspect of the present disclosure, the process according to the third aspect of the present disclosure differs in that it does not comprise a step of engaging the glass sheet with the suction cups. All other steps in the process according to the third aspect of the present disclosure can be derived, mutatis mutandis, from the above description of the steps of the process according to the first aspect.

According to the process of the third aspect of the present disclosure, the score-line is formed in step (IV), via, e.g., mechanical scoring or laser scoring described above in connection with the first aspect. Step (IV) is advantageously carried out prior to step (VI) wherein the edge portion of the glass sheet is pushed by a pushing bar in the direction from the first major surface to the second major surface such that the peripheral portions breaks away from the quality center portion of the glass sheet along the pre-formed score-line.

Step (VI) requires the presence of a nosing strip supporting the second major surface. Thus, step (VI) is carried out simultaneously with or after step (V).

Similar to the process according to the first aspect of the present disclosure, the process of the third aspect is particularly advantageous for processing glass sheets that are warped in the direction from the upper edge surface to the lower edge surface when the glass sheet has a substantially uniform temperature at room temperature and is not subjected to external force. As discussed supra, such warped glass sheets may be produced by, e.g., fusion down-draw or slot down-draw, or other processes.

A fourth aspect of the present disclosure is an apparatus for carrying out certain embodiments of the process according to the third aspect of the present disclosure, comprising the following:

(A) a glass suspension device adapted for placing the glass sheet in a vertical position by restraining the first and second major surfaces in the vicinity of the upper edge surface;

(B) a first side edge restraining tower located on the side of the first major surface comprising a first side edge restraining clamp strip, and a second side edge restraining tower located on the side of the second major surface comprising a second side edge restraining clamp strip, the distance between the first side edge restraining clamp strip and the second side edge restraining clamp strip being adjustable and adapted for restraining the first and second major surfaces in the vicinity of the first side edge surface at a distance D1 from the end of the first side edge surface from the upper edge surface to the lower edge surface;

(C) a mechanical scoring wheel installed on the first side edge restraining tower adapted for vertical motion in contact with the first major surface to form a score-line on the first major surface extending from the vicinity of the upper edge surface to the vicinity of the lower edge surface at a distance from the end of the first side edge surface D2, where D2<D1;

(D) a straight, vertical bar adapted for pushing the first major surface towards the second major surface; and (E) a nosing strip opposing the score-line adapted for contacting the second major surface.

Compared to the apparatus of the second aspect of the present disclosure, the apparatus of the first aspect of the present disclosure does not comprise the suction cups. All other components in the apparatus of the fourth aspect of the present disclosure can be derived, mutatis mutandis, from the above description of the first and second aspects.

Surprisingly, it was found that the process and apparatus according to the third and fourth aspect of the present disclosure were much more advantageous than those according to the first and second aspect for bead-removal of glass sheets having a center thickness Th(C) below 400 µm. For example, experiments showed that for glass sheet having Th(C) of 300 µm, the yield of a process according to the third aspect using an apparatus according to the fourth aspect had a yield of 61%, while the yield of a process according to the first aspect using an apparatus according to the second aspect was merely 46%, and a process according to the comparative example described below was merely 30%. Thus, the process and apparatus according to the third and fourth aspects of the present disclosure are advantageously used in certain embodiments for the peripheral portion removal of glass sheets having a center thickness Th(C) of at least 300 µm, such as at 350 µm, 400 µm, 500 µm, 600 µm, 700 µm, and above.

The present invention is further illustrated by the following non-limiting examples.

EXAMPLES

Example 1

Inventive

Figure 2:
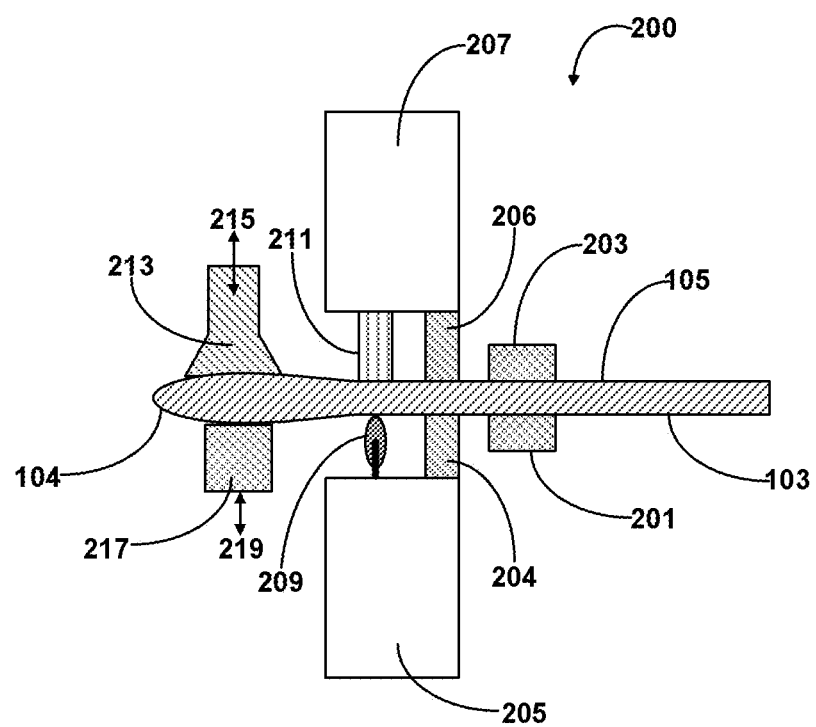
FIG. 2 is a schematic illustration of an apparatus according to one embodiment of the present disclosure using suction cups assisted by a pushing bar for removing a peripheral region of a glass sheet.
Figure 2:
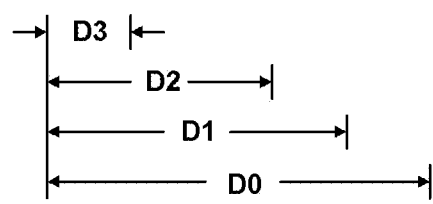

FIG. 2 schematically illustrates a cross-sectional view of one end of a glass sheet bead removing apparatus 200 in operation according to certain embodiments of the first and second aspects of the present disclosure. The other end, substantially symmetrical to the end shown, is not shown. The glass sheet shown in FIG. 1 is being secured by the two clamping arms 201, 203 of a clamp affixed to a suspension device (not shown) such as a vertical glass sheet suspension conveyor. Normally, the glass sheet is first engaged with the clamping arms 201 and 203 outside of the peripheral portion removing apparatus 200, and is then moved into the apparatus 200 by the conveyor. Inside the peripheral portion removing apparatus 200, a first side edge restraining tower 205 comprising a first side edge restraining clamp strip 204 is located on the side of the first major surface 103 of the glass sheet, and a second side edge retraining tower 207 comprising a second side edge restraining clamp strip 206 is located on the side of the second major surface 105 of the glass sheet. Thus, during operation, the first and second side edge restraining clamp strips 204 and 206 move towards each other once the glass sheet is positioned inside the apparatus 200, engages the glass sheet, restrain the portion of the glass sheet close to the beaded region, and secure the glass sheet to enable the following steps. Once the glass sheet is clamped on both sides by the restraining towers (only one side shown in this figure), a score-wheel 209, installed on the first side edge restraining tower 205, touches the first major surface 103 of the glass sheet at a location in the vicinity of the upper edge surface, but does not directly touch the very edge line of the upper edge surface. Backed by a nosing strip 211, installed on the second side edge restraining tower 207 and extending from the upper edge surface to the lower edge surface, the score-wheel forms a score-line extending from the vicinity of the upper edge surface to the vicinity of the lower edge surface by scoring from the top to the bottom of the glass sheet. Once scoring is completed, the score-wheel is retracted from the first major surface. A straight pushing bar 217 then advances in the direction 219 towards the first major surface of the glass sheet, contacts the peripheral portion of the glass sheet, and pushes the first major surface of the peripheral portion towards the second major surface of the glass sheet. In the mean time, a series of suction cups 213 (only one shown) advances towards the second major surface 105 and engages the side of the second major surface of the peripheral portion of the glass sheet. Due to the collaboration between the pushing bar 217 and the suction cups 213, the time for completing the engagement of the suction cups with the second major surface of the glass sheet is reduced compared to the embodiment in the comparative example illustrated in FIG. 4 and described below. Once the suction cups are firmed engaged to the second major surface of the glass sheet, the peripheral portion of the glass sheet is then pulled by the suction cups in the direction from the first major surface to the second major surface. The pushing bar 217 may retract immediately after the completion of the engagement of the suction cups to the second major surface without further pushing the glass sheet, or, alternatively, it can continue to push the glass sheet together with the suction cups. When the pushing reaches a threshold level, the peripheral portion, including the beaded region, separates along the score-line. Afterwards, the suction cups disengage with the second major surface of the glass sheet, releasing the removed peripheral portions to the glass chard collector down below. The first and second restraining clamp strips 204 and 206 of the restraining towers then move away from each other, releasing the two side portions of the remaining quality area. The quality portion of the glass sheet is then moved out of the peripheral portion removing apparatus 200 by the suspension conveyor to the next process step, such as edge finishing, washing, cleaning, and the like.

The reduced suction cup engagement time means higher throughput of the apparatus 200, more consistent process performance, and lower failure rate due to unsuccessful suction cup engagement. An experiment using this apparatus 200 achieved 46% of yield when processing a glass sheet having a thickness of 300 µm for bead removal.

Example 2

Inventive

Figure 3:
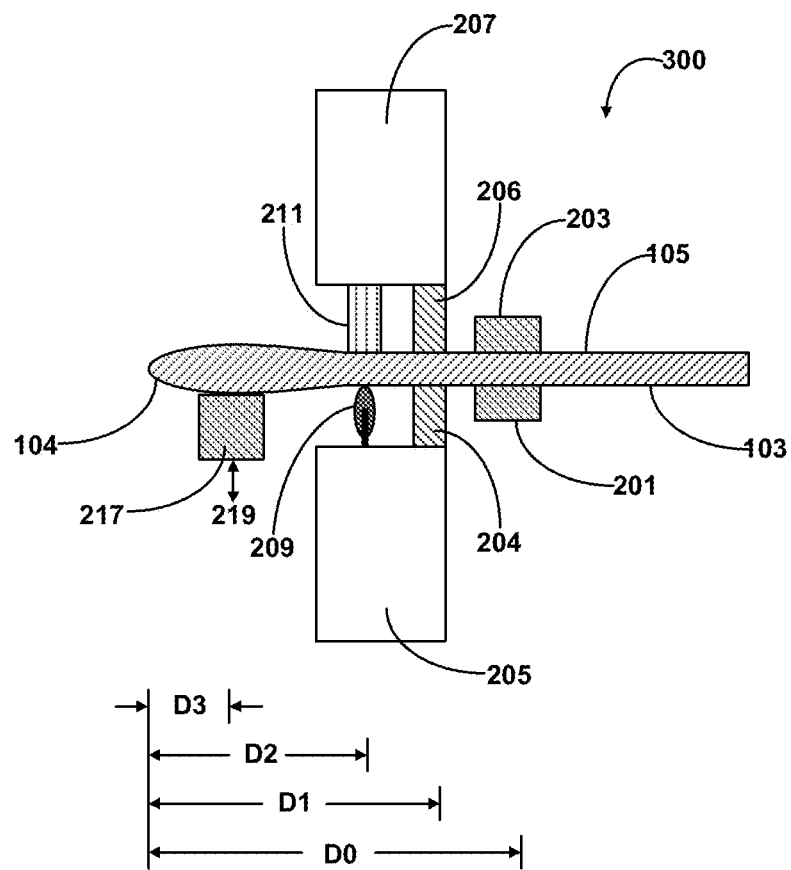
FIG. 3 is a schematic illustration of an apparatus according to one embodiment of the present disclosure using a pushing bar without suction cups for removing a peripheral region of a glass sheet.

FIG. 3 schematically illustrates a cross-sectional view of one end of a glass sheet peripheral portion removing apparatus 300 in operation according to certain embodiments of the third and fourth aspects of the present disclosure. The other end, being symmetrical, is not shown. As can be seen, compared to the apparatus 200 of FIG. 2, the apparatus 300 does not comprise the suction cups 213. This simplified apparatus can be advantageously used for peripheral portion removal of glass sheets with relatively large thickness Th(C) of at least 400 µm. When Th(C)<400 µm, additional restraining of the bead region of the glass sheet is desired to achieve consistent separation of the peripheral portion along the score-line.

An experiment using this apparatus 400 achieved 61% of yield when processing a glass sheet having a thickness of 300 µm for bead removal.

Example 3

Comparative

Figure 4:
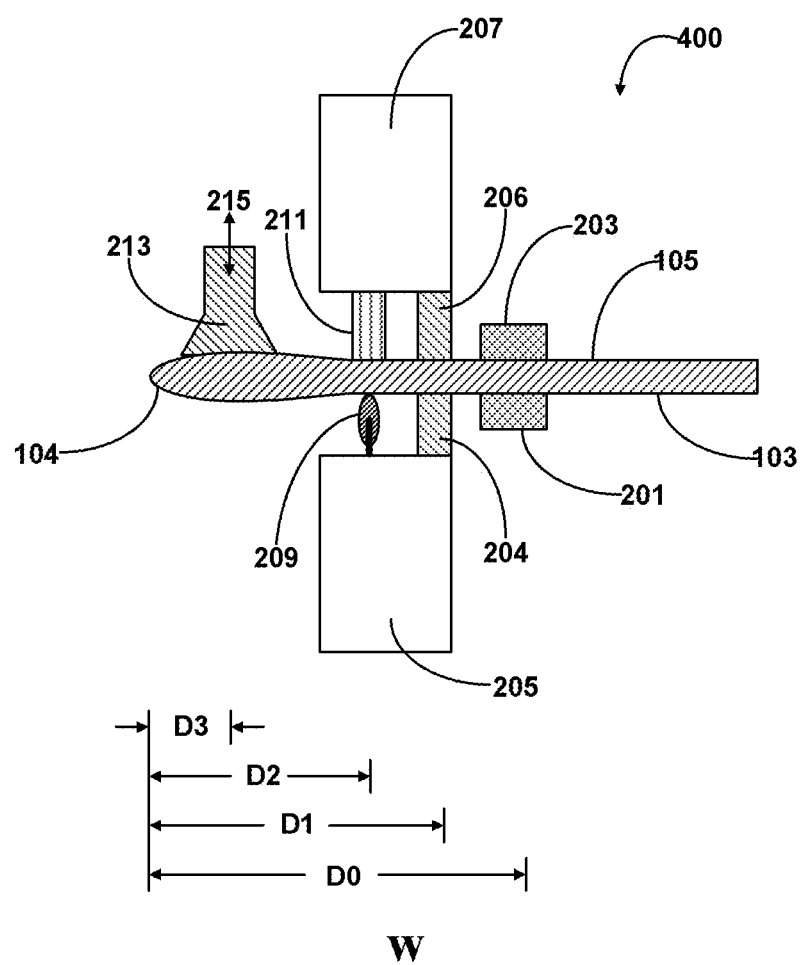
FIG. 4 is a schematic illustration of an apparatus in a comparative example using suction cups only for removing a peripheral region of a glass sheet.

FIG. 4 schematically illustrates a cross-sectional view of one end of a glass sheet peripheral portion removing apparatus 400 in operation, as a comparative example. The other end, being symmetrical, is not shown. As can be seen, compared to the apparatus 200 of FIG. 2, the apparatus 400 does not comprise the pushing bar 217. While this simplified apparatus 400 can be used for peripheral portion removal of glass sheets with relatively large thickness Th(C) of at least 500 μm, such as those at 600 μm and 700 μm, the cycle time of the bead removal process is longer than required for the apparatus 200 described supra due to longer time required for completing suction cup engagement.

An experiment using this apparatus 400 achieved 30% of yield when processing a glass sheet having a thickness of 300 μm for bead removal.

It will be apparent to those skilled in the art that various modifications and alterations can be made to the present invention without departing from the scope and spirit of the invention. Thus, it is intended that the present invention cover the modifications and variations of this invention provided they come within the scope of the appended claims and their equivalents.

What is claimed is:

1. A process for removing a first peripheral portion of a glass sheet, comprising the following steps:
   (I) providing a glass sheet having a first major surface, a second major surface opposing the first major surface, a center region having a center thickness Th(C), an upper edge surface, a lower edge surface, a first side edge surface, a first bead region corresponding and adjacent to the first side edge surface, a second side edge surface, and a second bead region corresponding and adjacent to the second side edge surface, each edge surface connecting the first major surface and the second major surface, and the first peripheral portion in the vicinity of the end of the first side edge surface, said first bead region being comprised within said first peripheral portion;
   (II) placing the glass sheet in a predetermined position by restraining the first and second major surfaces in the vicinity of the upper edge surface;
   (III) after step (II), restraining the first and second major surfaces in the vicinity of the first side edge surface at a distance D1 from the end of the first side edge surface from the upper edge surface to the lower edge surface;
   (IV) after step (III), forming a score-line on the first major surface extending from the vicinity of the upper edge surface to the vicinity of the lower edge surface at a distance from the end of the first side edge surface D2, where D2<D1;
   (V) pushing the first major surface towards the second major surface at a distance from the end of the first side edge surface D3, where D3<D2;
   (VI) after step (V), engaging the second major surface of the first peripheral portion with a plurality of suction cups;
   (VII) contacting the second major surface with a nosing strip opposing the score-line;
   (VIII) after steps (VI) and (VII), pulling the second major surface in a direction away from the first major surface by the suction cups, such that the first peripheral portion of the glass sheet in the vicinity of the first side edge surface bends against the nosing strip, such that the first peripheral portion, including the first bead region, separates along the score-line from the center region of the glass sheet.

2. A process according to claim 1, wherein in step (I), the first peripheral portion of the glass sheet as provided is warped in the direction from the upper edge surface to the lower edge surface when the glass sheet has a substantially uniform temperature at room temperature and is not subjected to an external force.

3. A process according to claim 1, wherein in step (VI), the engagement of all the suction cups to the second major surface of the first peripheral portion is completed in at most 5 seconds.

4. A process according to claim 1, wherein in step (III), the first and second major surfaces in the vicinity of the first side edge surface are secured by a clamp at a distance D1 from the end of the first side edge surface from the upper edge surface to the lower edge surface.

5. A process according to claim 1, wherein step (VII) precedes step (IV), and in step (IV), a mechanical score wheel is used to press against the first major surface and form the score-line.

6. A process according to claim 1, wherein in step (I), the center thickness Th(C) of the glass sheet is at least 400 μm.

7. A process according to claim 1, wherein in step (V), the first major surface is pushed in a direction towards the second major surface using a straight pushing bar.

8. A process according to claim 7, wherein in step (V), the straight pushing bar has a height extending substantially from the upper edge surface to the lower edge surface.

9. A process according to claim 7, wherein in step (VIII), while the second major surface of the glass sheet is being pulled by the suction cups, the first major surface is simultaneously being pushed by the straight pushing bar.

* * * * *